(12) United States Patent
Agrawal et al.

(10) Patent No.: US 8,880,030 B2
(45) Date of Patent: Nov. 4, 2014

(54) SERVING TIME CRITICAL INFORMATION TO MOBILE DEVICES

(75) Inventors: Dakshi Agrawal, Monsey, NY (US);
Thai V. Le, White Plains, NY (US);
Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 13/417,952

(22) Filed: Mar. 12, 2012

(65) Prior Publication Data

US 2013/0237186 A1 Sep. 12, 2013

(51) Int. Cl.
*H04M 1/66* (2006.01)

(52) U.S. Cl.
USPC .................. 455/411; 455/412.1; 455/410

(58) Field of Classification Search
CPC ............................... H04W 12/04; H04W 4/06
USPC ....................... 455/411, 412.1, 410
See application file for complete search history.

(56) References Cited

U.S. PATENT DOCUMENTS

| | | | |
|---|---|---|---|
| 2002/0077909 A1 | 6/2002 | Kanojia et al. | |
| 2003/0083940 A1 | 5/2003 | Kumar et al. | |
| 2003/0188188 A1* | 10/2003 | Padmanabhan et al. | 713/201 |
| 2004/0243470 A1 | 12/2004 | Ozer et al. | |
| 2005/0267798 A1 | 12/2005 | Panara | |
| 2006/0013401 A1* | 1/2006 | Wingert | 380/278 |
| 2006/0193474 A1* | 8/2006 | Fransdonk | 380/279 |
| 2006/0236090 A1* | 10/2006 | Birum et al. | 713/150 |
| 2006/0242267 A1 | 10/2006 | Grossman | |
| 2007/0005429 A1 | 1/2007 | Jacobs et al. | |
| 2011/0131338 A1 | 6/2011 | Hu | |
| 2012/0300687 A1* | 11/2012 | Aksu et al. | 370/312 |
| 2013/0114812 A1* | 5/2013 | Gidwani | 380/255 |
| 2013/0115911 A1* | 5/2013 | Vishwanathan et al. | 455/406 |

OTHER PUBLICATIONS

Cheon et al., "Provably Secure Timed-Release Public Key Encryption", ACM Transactions on Information and System Security (TISSEC), vol. 11 Issue 2., Article 8, Pub. date: May 2008.
Emura et al., "A timed-release proxy re-encryption scheme and its application to fairly-opened multicast communication", ProvSec'10 Proceedings of the 4th international conference, (2010) pp. 200-213.
Chow et al., "Timed-Release Encryption Revisited", ProvSec '08 Proceedings of the 2nd International Conference on Provable Security, (2008) pp. 38-51.
Cheon et al., "Timed-Release and Key-Insulated Public Key Encryption", Financial Cryptography and Data Security, Lecture Notes in Computer Science, 2006, vol. 4107/2006, 191.

* cited by examiner

*Primary Examiner* — Barry Taylor
(74) *Attorney, Agent, or Firm* — Scully, Scott, Murphy & Presser PC; Jennifer R. Davis, Esq.

(57) ABSTRACT

A method, system and computer program product for disseminating information to mobile communication devices from a content provider via a core network. In an embodiment, the content provider sends specified information to the core network, and the content provider sends an information dissemination policy and a time release policy to the core network. The core network determines a time distribution plan for disseminating the specified information, and disseminates the specified information to one or more of the mobile communication devices in accordance with the dissemination policy from the content provider and the time distribution plan. The core network enables the one or more of the mobile devices to release the specified information to a user or users of the one or more of the mobile devices in accordance with the time release policy from the content provider.

20 Claims, 3 Drawing Sheets

SERVING TIME CRITICAL INFORMATION TO MOBILE DEVICES

STATEMENT REGARDING FEDERALLY SPONSORED RESEARCH AGREEMENT

This invention was made with Government support under Contract No.: W911NF-06-3-0001 (U.S. Army). The Government has certain rights in this invention.

BACKGROUND OF THE INVENTION

This invention generally relates to mobile communications, and more specifically, to serving time critical information to mobile devices.

Mobile communications has become very widespread, and its use will almost certainly increase substantially. A variety of devices, such as cell phones, smart phones, and personal digital assistants, are used to receive many types of data and information such as telephone calls, music and videos, including television programming.

Mobile communication devices are increasingly being used in connection with the purchase of goods and services. The devices are used actually to purchase goods and services and also to receive information, including advertisements and coupons, about goods and services.

Many advertisements/offers are time critical—if they are released to the public too early, competitive advantage may be lost. In the United states, for example, the Friday after Thanksgiving, referred to as Black Friday, is one such example, where retailers go to great lengths to keep their advertisements and offers secret. Maintaining this secrecy, however, creates a distribution problem. In order for physical advertisements and coupons to reach customers, the advertisements and coupons should be distributed in advance. This advance distribution, though, creates a risk that the secrecy of the advertisement, or a related marketing strategy, may be lost, either by accident or through improper use.

This advance distribution problem is true of traditional media and holds true in the digital domain as well. This problem—the risk of losing secrecy or confidentiality as a result of the need to distribute information in advance—exists in many other areas as well, such as revealing a company's quarterly reports, expert picks on new video games and smart phone apps.

In all these examples, the content provider and the network service providers face the challenge of delivering digital content to millions of users at the appointed release time—neither too early nor too late. This results in peak traffic/flash floods at the network service provider (in particular, bandwidth constrained wireless/mobile/cellular networks); however, pushing digital content ahead of time to the users violates the times release constraint as mandated by the content provider.

BRIEF SUMMARY

Embodiments of the invention provide a method, system and computer program product for disseminating information to mobile communication devices from a content provider via a core network. In an embodiment, the content provider sends specified information to the core network, and the content provider sends an information dissemination policy and a time release policy to the core network. The core network determines a time distribution plan for disseminating the specified information and disseminates the specified information to one or more of the mobile communication devices in accordance with the dissemination policy from the content provider and the time distribution plan. The core network enables the one or more of the mobile devices to release the specified information to a user or users of said one or more of the mobile devices in accordance with the time release policy from the content provider.

In an embodiment, the specified information is encrypted when the specified information is disseminated to the one or more of the mobile devices; and the core network enables the one or more of the mobile devices to release the specified information by sending to the one or more of the mobile devices a decryption key for decrypting the encrypted specified information. The decryption key is sent to the one or more of the mobile devices in accordance with the time release policy from the content provider.

In one embodiment, the content provider encrypts the specified information and sends to the core network the security key for decrypting the encrypted specified information.

In an embodiment, the dissemination policy from the content provider identifies one or more geographic locations of a target audience, and the core network disseminates the specified information to the one or more of the mobile devices based on said one or more identified geographic locations.

In one embodiment, the dissemination policy identifies one or more criteria for selecting a target audience, and the core network disseminates the specified information to the one or more of the mobile devices based on said identified one or more criteria.

In one embodiment, the mobile communication devices are grouped into a plurality of different groups, and the core network enables the mobile communication devices of the different groups to release the specified information at different times.

In an embodiment, the operating system of each of the one or more of the mobile communication devices stores the specified information in a manner that is not accessible by the user of the mobile communication device.

In one embodiment, the core network enables the one or more of the mobile devices to release the specified information by sending instructions to the operating system of each of the one or more of the mobile communication devices to allow the user of said each of the one or more of the mobile communication devices access to the specified information on said each of the one or more of the mobile communication devices.

In an embodiment, the core network includes a master key server, and the content provider sends the specified information and the information dissemination policy to this master key server. The master key server determines which one or more of the mobile communication devices are to receive the specified information and determines when to send the specified information to said one or more of the mobile communication devices.

In one embodiment, the content provider encrypts the specified information and sends to the master key server of the core network a security key for decrypting the specified information, and the content provider sends the information dissemination policy and the time release policy to this master key server.

In an embodiment, the core network includes a plurality of edge key servers, and the master key server forwards the security key to one or more of the edge key servers with instructions on where and when to send the security key. The one or more of the edge key servers sends this security key to the one or more of the mobile devices in accordance with these instructions.

Embodiments of the invention provide a number of important advantages. For instance, embodiments of the invention solve flash crowd effects when a highly anticipated content is released and the demand may result in traffic congestion in resource-limited wireless networks. Using embodiments of the invention, content providers can send the information to the wireless networks which will disseminate the information to a large population when the network resources are available (free). The content providers make the content accessible to end users only at a later time (e.g., by releasing the security keys).

DETAILED DESCRIPTION

Figure 1:
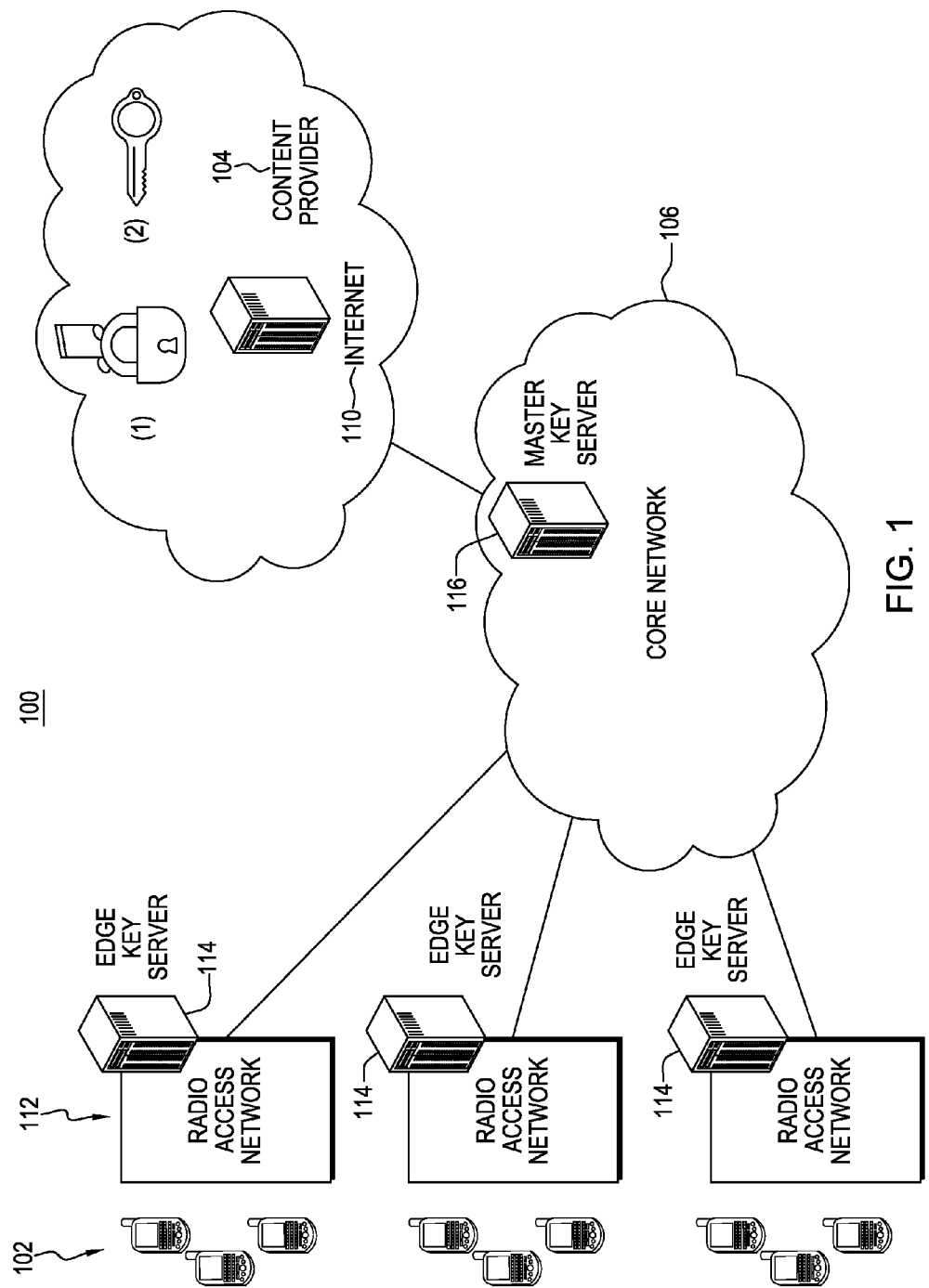
FIG. 1 illustrates a method and system for serving time critical information to mobile devices in accordance with an embodiment of the invention.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 illustrates a communication environment 100 for serving time critical information to mobile devices 102. The information is provided by a content provider 104 and is sent to the mobile devices via a core network 106. In the example environment depicted in FIG. 1, the content provider 104 sends the information to the core network 106 over a distributed network 110 such as the Internet. The core network 106, in turn, transmits the information to the mobile devices 102 through a series of Radio Access Networks (RANs) 112.

The core network 106 (e.g., in an LTE architecture) is employed to facilitate communications between communication devices, such as cellular phones and laptop computers. The core network can comprise various components, such as a Serving Gateway (SGW) and a Packet Data Network Gateway (PDN-GW), to facilitate providing connectivity for the communication devices and to route data to and from those communication devices.

The core network 106 also can allocate resources to the mobile devices 102, convert or enforce protocols, establish and enforce Quality of Service (QoS) for the mobile devices, provide applications or services in the network, translate signals, and perform other desired functions to facilitate system interoperability and communications in the wireless communication network. The core network 106 can include components such as routers, nodes, switches, interfaces, and controllers, that can facilitate communications of data between communication devices in the communication network. The core network, as mentioned above, can include a serving gateway (SGW) that can be directly or indirectly connected to the radio access networks 112. The SGW can route data packets to and from the mobile devices and from and to other communication devices and also can act as a mobility anchor during inter-base station handovers and as a mobility anchor between LTE and other 3GPP technologies.

Each radio access network 112 includes or may function as a base station for or in core network, and each of the mobile devices is operatively connected to one of the RANs. Each base station serves a respective coverage area or cell, and each base station can service mobile wireless devices located in the respective area covered by the base station. The mobile devices can be connected to the base stations and can communicate wirelessly using a variety of wireless technologies, including, for example, cellular, wi-Fi, wi-Max, and wireless area networks (WLANs).

A wide variety of mobile devices 102 may be used in embodiments of the invention, and, for example, the mobile devices may include portable phones, such as cell phones or the like, a smart phone, a Session Initiation Protocol (SIP) phone, a video phone, a portable email device, a thin client, or a portable gaming device. Mobile devices may also be, as additional examples, tablet computers and single-purpose mobile devices (such as eBooks).

The mobile devices 102 are in wireless communication with the core network 106 through the RANs 112 in accordance with protocols as known by those skilled in the art. Each RAN has an antenna whose radio coverage is typically tuned to a specific geographic area. As will be understood by those skilled in the art, it should be noted that there need not necessarily be a one-to-one correspondence between cellular towers and geographic areas, in that multiple cellular towers may cover one area and one cellular tower may cover multiple areas.

As mentioned above, in FIG. 1, the content provider is represented at 104. Many specific types of content provider that provide a wide range of specific content may use or be used in embodiments of the invention. The content provided by these providers may include information about or related to, for example, shopping, financial services, gaming, auctions, and many others.

In the example shown in FIG. 1, the content provider 104 sends information to the core network 106 over the Internet. The Internet is a worldwide collection of computer networks and gateways that use the TCP/IP suite of protocols to communicate with one another. At the core of the Internet is a backbone of high speed data communication lines between major nodes or host computers comprised of thousands of commercial, government, education, and other computer systems that route data and messages. The present invention, it may be noted, may be implemented with a number of other types of distributed networks, such as, for example, an intranet, a local area network (LAN) or a wide area network (WAN), and the invention may be used with other protocols besides TCP (e.g., UDP, RTP, IP-in-IP (tunneling) etc.). The Internet shown in FIG. 1 is intended as an example of a distributed network and not as a limitation of the present invention.

In accordance with embodiments of the present invention, the confidentiality of information downloaded from content provider 104 to one or more of the mobile devices 102 is protected until a specified time.

Embodiments of the invention separate (1) the time when content is distributed to end-users and (2) the time when the same content becomes accessible to end-users. In resource constrained settings (such as mobile wireless networks), this approach enables a large range of applications including the timed release of content to large population of wireless users, distribution and rate-limitation of offers and coupons to end-users users.

In an embodiment, this separation can be achieved by encrypting the content, and only releasing a short (say, 128 bit) security key at a later time (when the content then becomes accessible) or through other mechanisms (e.g., having the end terminal's operating system locally store the content that is not accessible by users until a specified time). Embodiments of the invention use an edge key server 114 in the wireless infrastructure (for example, in the base stations to minimize bandwidth bottlenecks in the wireless infrastructure) and a master key server 116 in the core network which coordinates with BSS system and content management system of the wireless provider.

In wireless networks, embodiments of the invention can be enhanced through the exercise of either or both of the following two mechanisms:

1) The edge key server 114 located in the wireless infrastructure (for example, in base stations—BSS) that periodically broadcasts keys to the mobile devices attached to it.
2) The master (core) key server 116 that controls and manages how information such as ads are distributed to different geographies and that loads time and location specific keys into the edge key server.

The edge key server 116 works in conjunction with BSS to optimize advertisement and other content distribution according to time and location. The master key server generates time and location specific encryption keys, and it may additionally encrypt content using these time and location specific keys. The encrypted content is then handed over to the content distribution system of the wireless provider—the content may be delivered to millions of end users when the network load is low. The edge server 114 receives time and location specific keys from the master key server, and the edge key server distributes these keys to the mobile devices attached to it based on configured policies. Mobile devices 102, upon obtaining the keys, decrypt the content that could be decrypted using the obtained keys and provide this content to the end user.

In addition to facilitating scalability and more specifically, the large scale distribution of content to end-users, embodiments of the invention also allow merchants to rate-limit offered coupons to different classes of users. Coupons can be encrypted taking into consideration additional information (e.g., class of customers such as Gold, Silver, Bronze). Then, based on the coupon redemptions rates, merchants can decide to make a larger (or smaller) number of coupons available by releasing the corresponding security keys (e.g., first releasing keys for Gold customers, then releasing keys for Silver customers, etc.).

Figure 2:
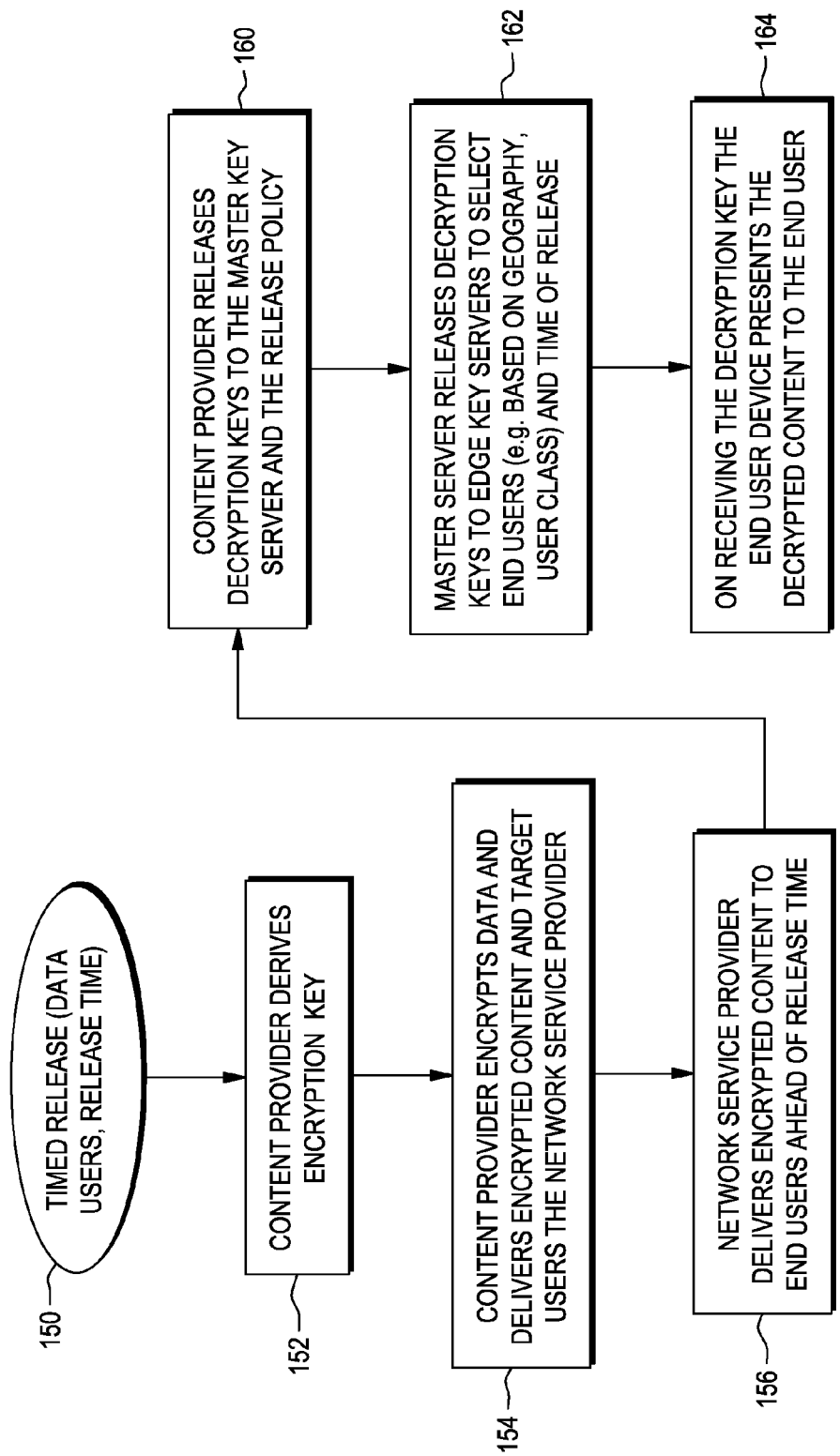
FIG. 2 is a flow chart depicting an example implementation of an embodiment of the invention.
Figure 3:
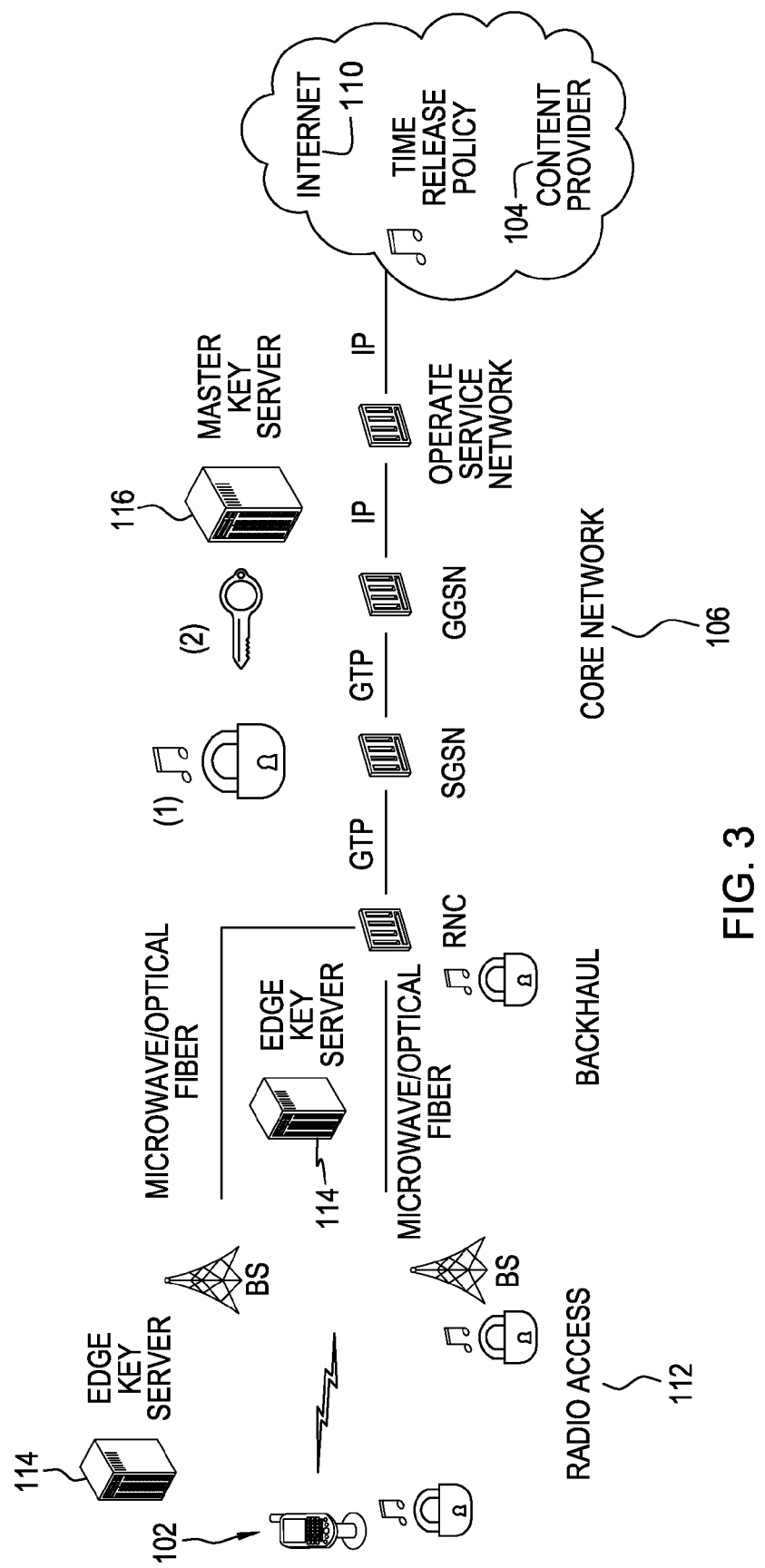
FIG. 3 pictorially illustrates an embodiment of the invention.

FIGS. 2 and 3 illustrate, as an example, steps involved in embodiments of the invention.

At steps 150, 152 and 154, the "Content Provider" sends the content to the wireless network's "Master Key Server". In addition to the encrypted content intended to be disseminated to the large population of users, the "Content Provider" may also provide additional information such as the preferred geographic location of the targeted audience, other criteria (e.g., income, class) of the targeted audience, and the time instant (or more generally, time interval) by which the content should be made available to the users.

Based on the provided information, the "Master Key Server" determines the areas and users where to send the content. The "Master Key Server" interacts with the different Radio Access Networks to assess the resource usage (e.g., air interface) and decide the best time to deliver the content to the different groups of users. The content is then delivered at step 156.

When the "Content Provider" wants to make the content available the Content Provider, at step 160, sends the security keys to the "Master Key Server". The "Content Provider" may provide additional information on how to advertise the security keys (e.g., specific release times to different groups of users, etc.).

From the information provided by the "Content Provider", the "Master Key Server," at step 162, determines the security keys to send to the "Edge Key Servers". The "Edge Key Servers" broadcast the security keys, allowing users, at step 164, to decrypt and access the content.

In an embodiment, the Content Provider sends content to the BSS server with stated preferences for the geographic location of the targeted audience, other criteria (e.g., gender, income, class) of the targeted audience, and the time instant (or more generally, time interval) by which the content should be made available to the users. The BSS server after determining distribution of spatial and temporal coupons, transfers this content to the master key server.

Embodiments of the invention may be employed effectively to solve flash crowd effects when a highly anticipated content is released and the demand may result in traffic congestion in resource-limited wireless networks. Using embodiments of the invention, content providers can send the information to the wireless networks which will disseminate the information to a large population when the network resources are available (free). The content providers make the content accessible to end users only at a later time (e.g., by releasing the security keys).

While it is apparent that the invention herein disclosed is well calculated to achieve the features discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of disseminating information to mobile communication devices from a content provider via a core network, the method comprising:
   the content provider sending specified information to the core network;
   the content provider sending an information dissemination policy and a time release policy to the core network;
   the core network determining a time distribution plan for disseminating the specified information;
   the core network disseminating the specified information to one or more of the mobile communication devices in accordance with the dissemination policy from the content provider and the time distribution plan determined by the core network; and
   the core network enabling the one or more of the mobile devices to release the specified information to a user or users of said one or more of the mobile devices in accordance with the time release policy from the content provider; and wherein the core network includes a master server to control and manage distribution of the specified information; and
   the master server receiving the specified information and the information dissemination policy from the content provider and determining areas and users where to send the specified information in accordance with the dissemination policy from the content provider, including the master server generating time and location specific encryption keys; and
   distributing the time and location specific encryption keys generated by the master server to the one or more of the mobile devices to enable the user or users of the one or more mobile devices, using the time and location specific encryption keys, to access the specified information at specific times and specific locations determined by the time and location specific encryption keys.

2. The method according to claim 1, wherein:
   the specified information is encrypted when the specified information is disseminated to the one or more of the mobile devices; and
   the enabling the one or more of the mobile devices to release the specified information includes the core network sending a decryption key for decrypting the encrypted specified information in accordance with the time release policy from the content provider.

3. The method according to claim 2, comprising the further step of the content provider sending to the core network a security key for decrypting the encrypted specified information; and wherein the core network enabling the one or more of the mobile devices includes the core network sending the security key to said one or more of the mobile devices.

4. The method according to claim 1, wherein:
   the dissemination policy from the content provider identifies one or more geographic locations of a target audience; and
   the core network disseminating the specified information includes the network disseminating the specified information to the one or more of the mobile devices based on said one or more identified geographic locations.

5. The method according to claim 1, wherein:
   the dissemination policy identifies one or more criteria for selecting a target audience; and
   the core network disseminating the specified information includes the network disseminating the specified information to the one or more of the mobile devices based on said identified one or more criteria.

6. The method according to claim 1, wherein:
   the mobile communication devices are grouped into a plurality of different groups; and
   the core network enabling the one or more of the mobile devices includes the core network enabling the mobile communication devices of the different groups to release the specified information at different times.

7. The method according to claim 1, wherein:
   each of the mobile communication devices includes an operating system: and
   the core network disseminating the specified information to the one or more of the mobile communication devices includes the operating system of each of the one or more of the mobile communication devices storing the specified information in a manner that is not accessible by the user of the mobile communication device.

8. The method according to claim 7, wherein the core network enabling the one or more of the mobile devices to release the specified information includes the core network sending instructions to the operating system of each of the one or more of the mobile communication devices to allow the user of said each of the one or more of the mobile communication devices access to the specified information on said each of the one or more of the mobile communication devices.

9. The method according to claim 1, wherein:
the content provider sends the specified information and the information dissemination policy to the master key server; and
the master key server determines which one or more of the mobile communication devices are to receive the specified information, and determines when to send the specified information to said one or more of the mobile communication devices.

10. The method according to claim 9, wherein:
the core network includes a plurality of edge key servers;
the content provider encrypts the specified information and sends to the master key server a security key for decrypting the specified information;
the content provider sends the information dissemination policy and the time release policy to the master key server;
the master key server forwards the security key to one or more of the edge key servers with instructions on where and when to send the security key; and
the one or more of the edge key servers sends the security key to the one or more of the mobile devices in accordance with said instructions; and
the one or more mobile devices use the security keys obtained from the edge key servers to decrypt the encrypted specified information and provide the decrypted specified information to the users of the mobile devices in accordance with the time release policy of the content provider.

11. The method according to claim 1, wherein:
the core network disseminating the specified information to one or more of the mobile communication devices includes the core network disseminating the specified information to the one or more of the mobile communication devices for subsequent release thereon, whereby the time when the specified information is distributed to the one or more mobile devices is separated from the time when the specified information becomes accessible to the user or users of the one or more of the mobile communication devices;
the information dissemination policy determines where and to which one or ones of the one or more of the mobile devices the specified information is sent;
the time distribution plan determines when the specified information is sent from the core network to the one or more of the mobile devices;
the time release policy determines when the specified information on the one or more of the mobile devices is made accessible to the user or users of the one or more mobile devices;
the core network includes a plurality of edge servers to broadcast to the mobile devices; and
the edge servers receive the time and location specific keys from the master server and distributes the time and location specific keys to the one or more mobile devices.

12. A system for disseminating information to mobile communication devices from a content provider via a core network, the system comprising:
one or more content provider servers for sending to the core network specified information, an information dissemination policy and a time release policy; and
one or more core network servers for receiving the specified information, the information dissemination policy and the time release policy, and for determining a time distribution plan for disseminating the specified information; and wherein:
the one or more core network servers disseminate the specified information to one or more of the mobile communication devices in accordance with the dissemination policy from the content provider and the time distribution plan determined by the core network; and
the one or more core network servers enable the one or more of the mobile devices to release the specified information to a user or users of said one or more of the mobile devices in accordance with the time release policy from the one or more content provider servers; and wherein the one or more core network servers includes a master server to control and manage distribution of the specified information; and
the master server receives the specified information and the information dissemination policy from the content provider, determines areas and users where to send the specified information in accordance with the dissemination policy from the content provider, and generates time and location specific encryption keys; and
the one or more core network servers distributing the time and location specific encryption keys generated by the master server to the one or more of the mobile devices to enable the user or users of the one or more mobile devices, using the time and location specific encryption keys, to access the specified information at specific times and specific locations determined by the time and location specific encryption keys.

13. The system according to claim 12, wherein:
the specified information is encrypted when the specified information is disseminated to the one or more of the mobile devices; and
the enabling the one or more of the mobile devices to release the specified information includes the one or more core network servers sending a security key for decrypting the encrypted specified information in accordance with the time release policy.

14. The system according to claim 12, wherein:
the dissemination policy identifies one or more criteria for selecting a target audience; and
the one or more core network servers disseminate the specified information to the one or more of the mobile devices based on said identified one or more criteria.

15. The system according to claim 12, wherein:
the mobile communication devices are grouped into a plurality of different groups; and
the one or more core network servers enable the mobile communication devices of the different groups to release the specified information at different times.

16. The system according to claim 12, wherein:
the one or more core network servers includes a master key server and one or more edge key servers;
the master key server determines which one or more of the mobile communication devices are to receive the specified information, and determines when to send the specified information to said one or more of the mobile communication devices;
the one or more content provider servers encrypts the specified information and sends to the master key server a security key for decrypting the specified information;
the master key server forwards the security key to one or more of the edge key servers with instructions on where and when to send the security key; and the one or more of the edge key servers sends the security key to the one or more of the mobile devices in accordance with said instructions.

17. An article of manufacture comprising:

at least one tangible computer readable hardware medium having computer readable program code logic tangibly embodied therein to disseminate information to mobile communication devices from a content provider via a core network, the computer readable program code logic, when executing, performing the following:

sending specified information from the content provider to the core network;

sending an information dissemination policy and a time release policy from the content provider to the core network;

using the core network to determine a time distribution plan for disseminating the specified information;

using the core network to disseminate the specified information to one or more of the mobile communication devices in accordance with the dissemination policy from the content provider and the time distribution plan determined by the core network;

using the core network to enable the one or more of the mobile devices to release the specified information to a user or users of said one or more of the mobile devices in accordance with the time release policy from the content provider; and wherein the core network includes a master server to control and manage distribution of the specified information;

the master server receiving the specified information and the information dissemination policy from the content provider and determining areas and users where to send the specified information in accordance with the dissemination policy from the content provider, including the master server generating time and location specific encryption keys; and distributing the time and location specific encryption keys generated by the master server to the one or more of the mobile devices to enable the user or users of the one or more mobile devices, using the time and location specific encryption keys, to access the specified information at specific times and specific locations determined by the time and location specific encryption keys.

18. The article of manufacture according to claim 17, wherein:

the specified information is encrypted when the specified information is disseminated to the one or more of the mobile devices; and the core network enables the one or more of the mobile devices to release the specified information by sending to the one or more of the mobile devices a security key for decrypting the encrypted specified information in accordance with the time release policy.

19. The article of manufacture according to claim 17, wherein:

the dissemination policy identifies one or more criteria for selecting a target audience; and the core network disseminates the specified information to the one or more of the mobile devices based on said identified one or more criteria.

20. The article of manufacture according to claim 17, wherein:

the mobile communication devices are grouped into a plurality of different groups; and the core network enables the mobile communication devices of the different groups to release the specified information at different times.

* * * * *